TEST SITES FOR MONOLITHIC CIRCUITS

Filed Jan. 15, 1968 3 Sheets-Sheet 1

IGOR ANTIPOV
IRVING FEINBERG
CHARLES H. VAN DE ZANDE
WAILEY L. WING
HORST H. BERGER
*INVENTORS*

BY [signature]
ATTORNEY

TEST SITES FOR MONOLITHIC CIRCUITS 3,507,036

TEST SITES FOR MONOLITHIC CIRCUITS

Igor Antipov, Pleasant Valley, Irving Feinberg, Poughkeepsie, Charles H. Van de Zande, Lagrangeville, and Wailey L. Wing, Poughkeepsie, N.Y., and Horst H. Berger, Sindelfingen, Germany, assignors to International Business Machines Corporation, Armonk, N.Y., a corporation of New York Filed Jan. 15, 1968, Ser. No. 697,752
Int. Cl. H01l 7/02
U.S. Cl. 29—574 12 Claims

ABSTRACT OF THE DISCLOSURE

A process for producing monolithic integrated circuits whereby unique configurations of components are provided at test sites, while regular circuits are being formed, on semi-conductor wafers. Two different kinds of test patterns are furnished; at some sites a special test circuit is formed, while at others a special metallurgical pattern is produced. By properly correlating the information from the above test sites with information derived from the regular integrated circuits a complete picture can be obtained regarding the yield and the reliability that can be expected.

BACKGROUND, SUMMARY AND OBJECTS OF THE INVENTION

This invention relates to semiconductor device and circuit manufacture, and more particularly, to a branch thereof known as integrated circuit manufacture. The invention is more particularly concerned with techniques of fabricating monolithic types of integrated circuits and for testing such circuits in order to determine completely the characteristics thereof, thereby assuring reliability of the finished circuits when placed into their operating environments.

The term "integrated circuits" encompasses a variety of techniques and forms in the field of micro-miniaturization or micro-circuitry. Certain forms of integrated circuits involve the formation of active devices, such as transistors, on "chips," i.e. integral pieces which have been cut from a semiconductor wafer. The chips are thereafter interconnected with passive components on a circuit board or module. In contrast therewith, the monolithic type of integrated circuit involves a completed circuit on the integral piece or "chip" of semiconductor material. In other words, in the monolithic case, all or substantially all of the elements that go to make up the circuit are formed in or on the wafer from which the chips are derived. Generally, the elements or components of the circuit are embedded within the wafer by means of the diffusion technology which, as is well known, involves the penetration of impurities within the monolith or wafer to varying predetermined depths. Of course, it is also known to form these components by various thin film techniques.

It might be thought to be a useful expedient simply to provide the conventional or regular integrated circuits within a wafer consisting of the aforesaid passive and active components and, then, to test these components as they are fabricated in this form. However, the difficulty with this approach is that in the normal formation of monolithic types of integrated circuits the interconnections are fixed and inaccessible and therefore do not readily serve for testing purposes. Therefore, this approach is completely unavailing in this situation.

In the development of integrated circuitry a basic revision has taken place in the design philosophy governing circuit manufacture. Rather than the focus of attention being on the individual device parameters, attention has shifted to the possibilities of higher yield for the entire circuit, thereby leading to cost reduction. The possibilities of improved yield stem from the advantageous processing which is possible with the new technology. Thus, the integrated design philosophy has tended to become more concerned with the economics of total performance, with reduced emphasis on the strict device tolerances previously adhered to. Nevertheless, reliability remains a sine qua non in the manufacture of such circuits. In other words, despite the accomplishment of good yield for integrated circuits, it is an inexorable rule that the components must perform reliably when put into service. For this reason it still remains necessary to test the various components of the circuit since the reliability thereof is no better than the reliability of the weakest component.

In the past, reliability studies have been more concerned with life tests on discrete components. Thus, capacitors, resistors and the like have each been individually tested to their maximum ability to absorb stress until they finally fail. However, with an integrated circuit, and especially a monolithic type, such a technique cannot be adopted for the reasons already advanced that the interconnections for the components in such monolithic circuits are not accessible because of the exigencies of the process involved in manufacture of these circuits. As has also been indicated, such a monolithic integrated circuit involves such a complicated pattern or interconnection of a multiplicity of components that these components cannot be readily isolated for testing purposes.

Certain testing arrangements have already been developed, in accordance with the prior art, for gaining some insight into the reliability that may be expected for integrated circuits. Reference may be made to U.S. Patent 3,304,594 by way of some background on testing procedures that have become known.

Despite the knowledge already gained there still remains a stumbling block to the proper testing of monolithic circuits. Thus, even though special test sites have been formed at certain locations on a semiconductor wafer, the information obtained by the various measurements which have been made is not sufficient to predict the performance and reliability of the regular integrated circuits that are being concurrently formed.

Accordingly, it is a primary object of the present invention to provide a simplified technique for obtaining all the needed information on the components of integrated circuits as they are manufactured so as to be able to form projections of the obtainable yield and to predict the reliability of the circuits produced.

Another object is to provide such a connection scheme for the test circuit or other test patterns that all the needed information can be obtained from a plurality of test sites.

Yet another object is to minimize the number of test terminals that are necessary for testing purposes by making the proper interconnections between components, but without introducing disturbing parasitics.

A subsidiary object, in line with the above object, is to minimize the number of necessary terminals by separating those test sites which furnish information regarding the electrical characteristics from those other test sites which are useful for obtaining information concerning the matallurgical characteristics.

Another object is to provide a technique, which coupled with a suitable program will enable correlation of all the essential test information and which, therefore, will make thoroughly predictable the yield from an integrated circuit process.

A more specific object is to make the required interconnections between components so as to permit exact $V_{BE}$ measurements in spite of the contact resistance between test probes and terminals and despite the resistance of interconnections.

Another specific object is to incorporate groups of resistors and transistors for enabling proper isolation measurements therebetween and for formulating yield projections therefrom.

Yet another object is to determine completely the quality of components, whether these be active or passive; more especially, to determine dynamic electrical characteristics of transistors.

A further object is to simplify the measurement of resistance of certain components and to do so accurately on a three point probe basis.

Another specific object is to enable the accurate measurement of the base to emitter voltage with a precise interconnection of transistors in a test circuit, and at the same time to measure with that circuit the performance capability of the regular integrated circuits of which the test circuit is representative.

The foregoing and other objects, features and advantages of the invention will be apparent from the following more particular description of preferred embodiments of the invention as illustrated in the accompanying drawings.

BRIEF DESCRIPTION OF DRAWINGS

FIG. 1 illustrates one embodiment of the invention, and in particular

FIG. 2 also illustrates the connection of apparatus for performing certain tests.

DESCRIPTION OF PREFERRED EMBODIMENTS

Figures 4, 5, 6:
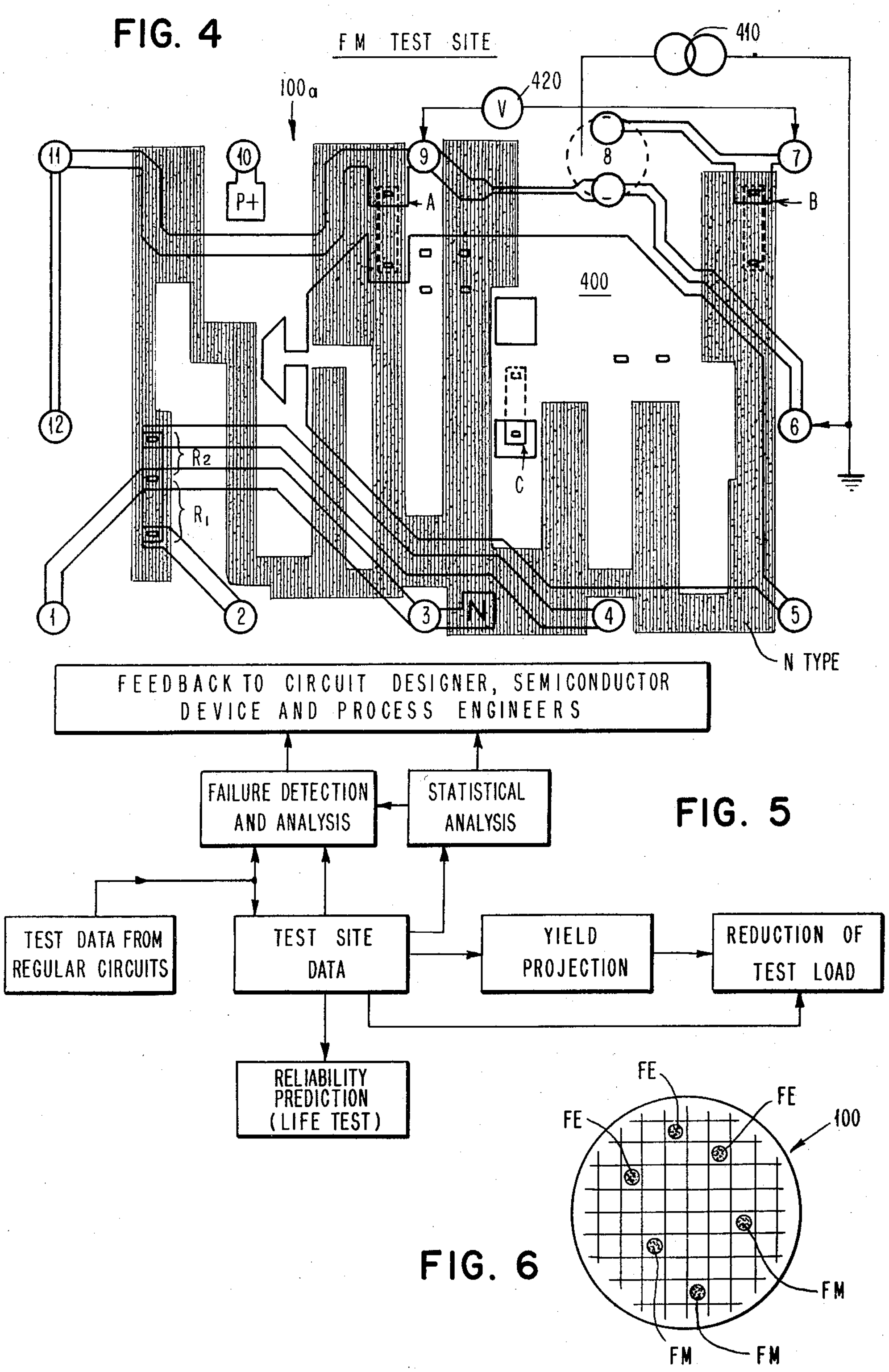
FIG. 4 is a plan view of the interconnection pattern, that is, the metallurgy which is formed on the semiconductor monolith.
FIG. 5 illustrates in block form the relationship between the various tests and the correlation and feeding of these test results for providing complete information on the integrated circuits.
FIG. 6 illustrates a silicon wafer which includes a large number of integrated circuits; it also illustrates a number of test sites in accordance with the present invention; that is, test sites for testing the electrical characteristics and, also, sites for testing the metallurgy.

Referring now to the figures, and particularly to FIG. 6, it will be appreciated that a tremendous number of integrated circuits are ordinarily fabricated on a single wafer. These wafers are then normally broken up into smaller pieces or "chips" for further processing. As may be seen in FIG. 6, a typical wafer 100 has a plurality of electrical test sites, designated FE, each occupying a chip 100*a* of the wafer. Likewise, a number of metallurgical test sites designated FM are also indicated. On a typical wafer there may be provided ten FE test sites and six FM test sites. Although these test sites of course represent a loss, this loss is small when weighed against the advantages the test sites afford.

The totality of integrated circuits is prepared in a batch on the wafer 100, which is usutlly constituted of silicon. Each of the squares not specifically marked FE or FM represents a regular integrated circuit. It should, therefore, be borne in mind that while the remainder of the description will concentrate on the test patterns, that is, those patterns formed at the FE and FM test sites, a tremendous number of regular circuits are being formed at the same time as the test patterns.

Figure 1A:
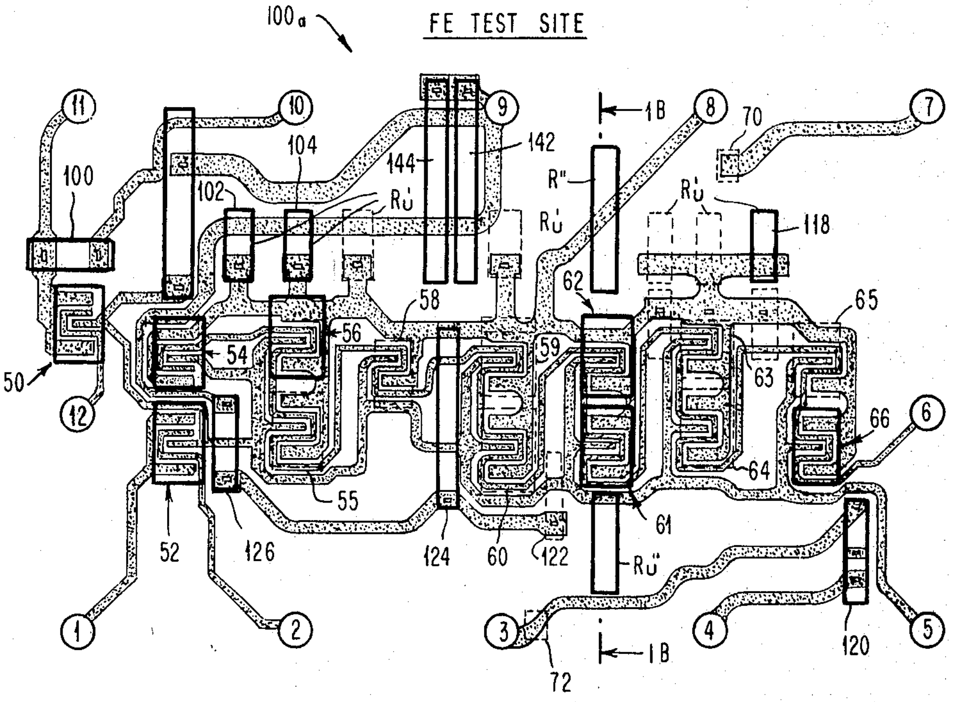
FIG. 1A is a plan view of a test pattern of an electrical test site on a semiconductor wafer.
Figure 1B:
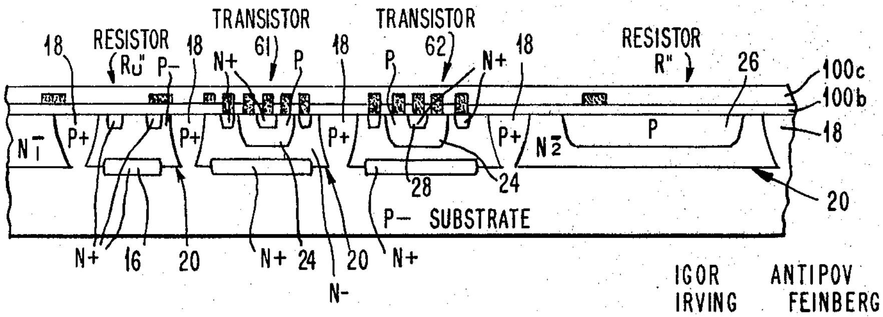
FIG. 1B is sectional view of same on the line 1—1.

A typical electrical test pattern that is formed in accordance with the concept of the present invention is particularly illustrated in FIGS. 1A and 1B. FIG. 1A is a resultant plan view illustrating the final test pattern, while FIG. 1B is a sectional view of same.

Figure 2:
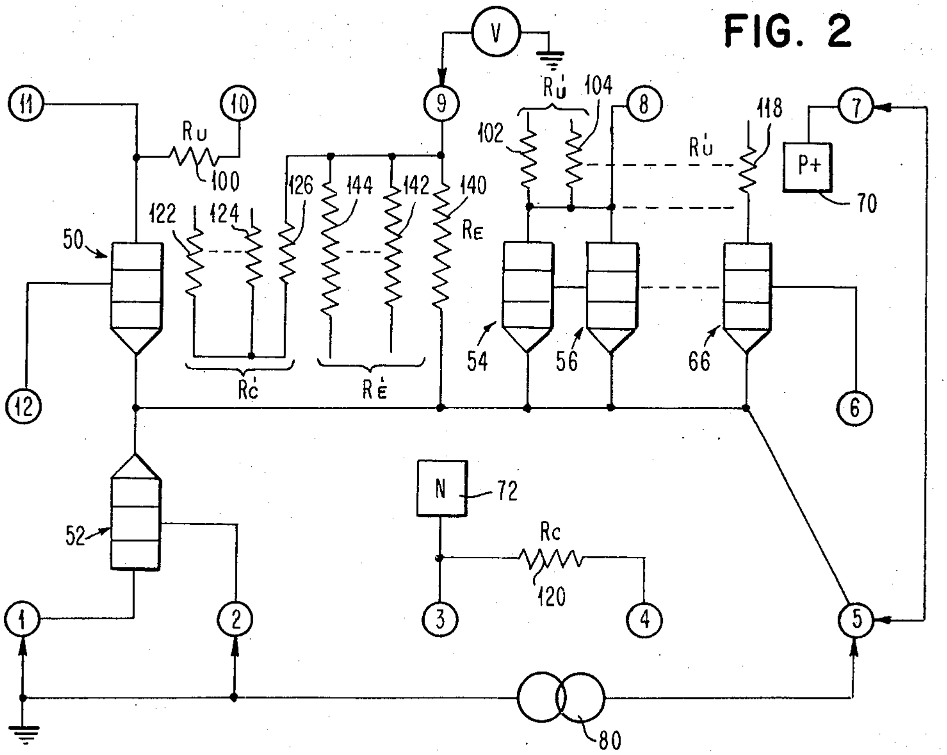
FIG. 2 is a schematic diagram of the pattern of interconnected components; the schematic herewith corresponding with the illustration of FIG. 1.

In the plan view of FIG. 1A, those components which correspond with components specifically illustarted in the schematic diagram of FIG. 2 are shown by means of heavily lined rectangles. Thus, transistors 50, 52, 54, 56 and 66 are so indicated. However, it will be understood, particularly as the description proceeds, that these are not the only transistors that have been interconnected within the chip 100*a*. Similarly, the heavily lined rectangles designated 102, 104 and 118 represent resistors that are specifically illustrated in the schematic diagram of FIG. 2.

It should be noted that the remaining elements shown by means of the heavily lined rectangles are not specifically illustrated in FIG. 2. Thus, the transistors 61 and 62 and the resistors R″ and $R_u$″ are indicated by the heavy lines because the sectional view of FIG. 1B has been taken through these elements for the purpose of explaining the typical formation of embedded components within the monolith.

As will be understood by those versed in the art, the chip 100*a* is in the form of a "master slice." This simply means that embedded components are formed in a standard configuration; then, for particular purposes, as for the case here illustrated, appropriate metalization patterns are created at the surface of the chip. The metal conductors or "lands" which form the necessary interconnections are indicated by the stippled pattern in FIG. 1A. The metal conductors terminate at the periphery of the chip 100*a* where they connect to the terminals 1–12.

The usual manner of producing the multiplicity of components which are either active devices, such as transistors or passive ones, such as resistors, in the substrate or wafer 100 is sufficiently well known in the art that a detailed description becomes unnecessary. However, it should be noted, in brief, that conventional photo-lithography techniques are applied to an insulative coated surface of the wafer to create the desired masking patterns. A sequence of appropriate diffusion steps is performed for creating the individual embedded components within the wafer 100. Additionally, the required metalization for contacting and interconnecting components is achieved by photo-lithography techniques.

Within the chip 100*a* as noted above, individual components are created. The layout or configuration for the embedded components can be appreciated by reference to the sectional view of FIG. 1B. Merely for the sake of convenience and for the purpose of showing a typical collectors fabrication, N+ sub-collector regions 16 are particularly indicated in this figure. These regions result from diffusion into the substrate prior to the formation of the N− epitaxial layer, which is a conventionally formed layer. A so-called isolation diffusion step is performed through the insulative coating 100*b* at the top of the structure shown in FIG. 1B. Thus, a silicon wafer 100 having been coated with an insulative coating, such as of a genetic oxide of silicon, a P conductivity-type impurity is diffused into the N− epitaxial layer so as to join or link up with the P− substrate. Consequently, there are produced what are often termed device "islands," designated 20. These are created due to the formation of the isolation regions 18 by the aforesaid diffusion step. The various regions defining particular components are generally formed within these device islands 20 by subsequent diffusions, likewise involving selective penetration of impurities. In general, then, selective diffusion is performed, that is, diffusion through suitable masking to create the various regions and this masking is accomplished by application of conventional photo-lithography techniques to the insulative coating 100*b*. After application of the metalization, in order to interconnect components, a conventional passivation layer 100*c* is formed at the surface.

The formation of four separate components may be seen in FIG. 1B. It should be especially noted that the resistor $R_u''$ is constituted by one of the device islands 20 shown in this figure. Thus, this resistor, which is of the type termed an "underpass resistor," is formed so as to be of the same conductivity type as the collectors of the embedded transistors, that is, to be of N conductivity type. Subsequent diffusion steps, that is, diffusion steps following the initial isolation diffusion step, create the other regions nested within the device islands 20. Thus, transistors 61 and 62 are produced by the base diffusion step which serves to create the base regions 24, and simultaneously, to form the region 26 which defines the resistor R''. In similar fashion, the emitter diffusion step, also well-known in the art, is performed to create the emitter regions 28, as well as the requisite contact regions.

The uniqueness of the interconnection arrangement and the minimization of terminals can, perhaps, best be appreciated by reference to the schematic diagram of FIG. 2. This diagram represents the circuit at a typical electrical test site. The reference numerals on this figure correspond with those which appear on FIG. 1. However, for the sake of simplicity in exposition, not all of the transistors in each group nor all of the resistors in the several groups have been specifically illustrated. Rather, they are indicated by the dotted lines shown between transistors and resistors. The control terminals are twelve in number as seen in FIG. 2. The arrows contacting the various control terminals simply represent the selective connection of external equipment when desired for making particular tests, as will be explained.

The interconnection arrangement of the components of the test circuit as depicted in FIG. 2 provides the following advantages. It allows accurate measurement of the $V_{BE}$ of two transistors while eliminating the contact resistance effect. Such accurate measurement has not heretofore been available in the art. The measurement of $V_{BE}$ is necessary because, in addition to circuit design information, one wants to assess the quality of the transistors since many AC–DC parameters are correlatable with $V_{BE}$ for a given transistor geometry. For example, beta, $f_T$ and $R_{BB}$ are such parameters. It will also be appreciated that $V_{BE}$ "tracking" is an important parameter in circuit design. In other words, it is important to be able to measure accurately the slight difference in $V_{BE}$ for two transistors. This is true even though the particular circuit configuration may not be precisely the configuration shown in FIG. 2.

The two transistors 50 and 52 constitute the means for performing the accurate measurement of $V_{BE}$, as well as serving for other purposes. These transistors are the NPN type but, of course, they could just as well be of opposite polarity to that shown. It should be especially noted that the emitters of these two transistors are directly tied together and to a common point, which in turn is connected to the control terminal 5. The collectors of the transistors 50 and 52 are connected respectively to the control terminals 11 and 1; the base of transistor 50 is connected to the control terminal 12, while the base of transistor 52 is connected to the control terminal 2.

As previously noted, one of the essential purposes of this particular connection for the transistors 50 and 52 is to allow switching measurements to be made very simply on this circuit. Furthermore, the emitters of these two transistors have been interconnected in order to save terminals, in accordance with the objective previously mentioned, of minimization of control terminals.

It will be noted in FIG. 2 that the emitter ($R_E$) resistor 140, as is used in the "current switch" type of transistor circuit, is connected to the aforesaid common point of joinder for the emitters. This emitter resistor 140 has associated with it like resistors 142 and 144 ($R_E'$), and also associated with it, a group of similar resistors ($R_C'$), specifically designated 122, 124 and 126. It will be understood, of course, that the particular number of these resistors is of no great consequence; rather, they are simply formed in a group for representing the average resistor area for emitter and collector resistors. In other words, all of these resistors ($R_E$, $R_E'$ resistors) partake of the characteristics for the emitter resistors which are being incorporated in the regular integrated circuits at other sites in the wafer 100. Likewise, the other resistors ($R_C$ aind $R_C'$) partake of the characteristics of the collector resistors, which are also being formed in the regular integrated circuits.

It will be noted that for ease of simplicity in making the variety of measurements required, the $R_c$ resistor designated 120 is shown connected between the control terminals 3 and 4, whereas the other resistors of this type ($R_C'$) have been connected as a group, the resistor 126 being connected to the terminal 9. This pin saving connection of the $R_C$ resistor 120 does not allow breakdown measurements against the N-bed, however, isolation can be checked with the entire resistor group having one end connected to the terminal 9. This grouping of resistors also allows checking for "pipes" (which are due to pin holes in the masking oxide during the isolation diffusion step). This undesired diffusion results in shorting a resistor or resistors with the substrate. Such isolation measurements are important in projecting the yield for the fabrication process.

Another group of resistors, which are underpass resistors ($R_U$ or $R_U'$) are also connected in the circuit of FIG. 2. A first $R_U$ resistor numbered 100 is connected between the control terminals 10 and 11, while a number of other resistors of the same type ($R_U'$) are so formed as to be connected to another transistor group. These underpass resistors are designated 102, 104 . . . 118, and they are connected to the group of transistors 54, 56 . . . 66. This latter transistor group again represents the average number of transistors used in an integrated circuit. As before, breakdown and isolation measurements are again helpful in formulating the yield projection. For the same reason as was advanced previously in respect to the connections for the emitter and collector type resistors, the underpass resistors 102, 104 . . . 118 are tied to control terminal 8. This connection, common with the collectors, does not interfere with yield prediction since the isolation of the $R_U$ resistors is much more important than that of the collectors (an underpass resistor is, in a regular circuit, normally connected in the base line or base circuit).

It will be noted that the bases of the transistors in this latter group, that is, the bases of the transistors 54, 56 . . . 66 are tied in common to the terminal 6, while their emitters are tied in common to the terminal 5. The substrate is connected to the control terminal 7 by way of the isolation diffusion area symbolized P+ and designated 70, without any additional connection. This allows an accurate measurement of the isolation of the substrate. It also permits the life test of the important P+N-junction which gets the highest voltage in a regular circuit. It will be understood, of course, that the contact area 72 to the epitaxial layer is also employed for this purpose.

The particular connection of the emitter ($R_E$) resistor 140 to the common emitter point provides a way to measure the $V_{BE}$ of the transistors with negligible parasitic voltage drop, as will be apparent from a consideration of the diagram of FIG. 2. As can be seen, control terminal 5 is needed in any event in order to allow the measurement of the resistance of $R_E$ resistor 140.

The connection of external equipment in order to perform one exemplary test is indicated by means of the arrows shown in FIG. 2. Thus, the generator 80 is shown with its positive side connectible to both of the terminals 1 and 2 and to ground. The negative terminal of the generator 80 is shown connectible to control terminal 5. Additionally, a volt meter is shown connectible at one end to the control terminal 9 and at the other end to ground potential. With current supplied between control terminal 5 and also to the control terminals 1 and 2, a very precise measurement of the voltage drop occurring between the base and emitter $V_{BE}$ of the transistor 52 can be obtained, as will be readily understood. In similar fashion, measurement of $V_{BE}$ for transistor 50 is made.

It will be appreciated that specific connections to test circuit have been merely indicated by way of example and that a variety of required tests will be made by suitable connection to appropriate terminals, all of the terminals that are needed for obtaining complete information having been provided.

Figure 3:
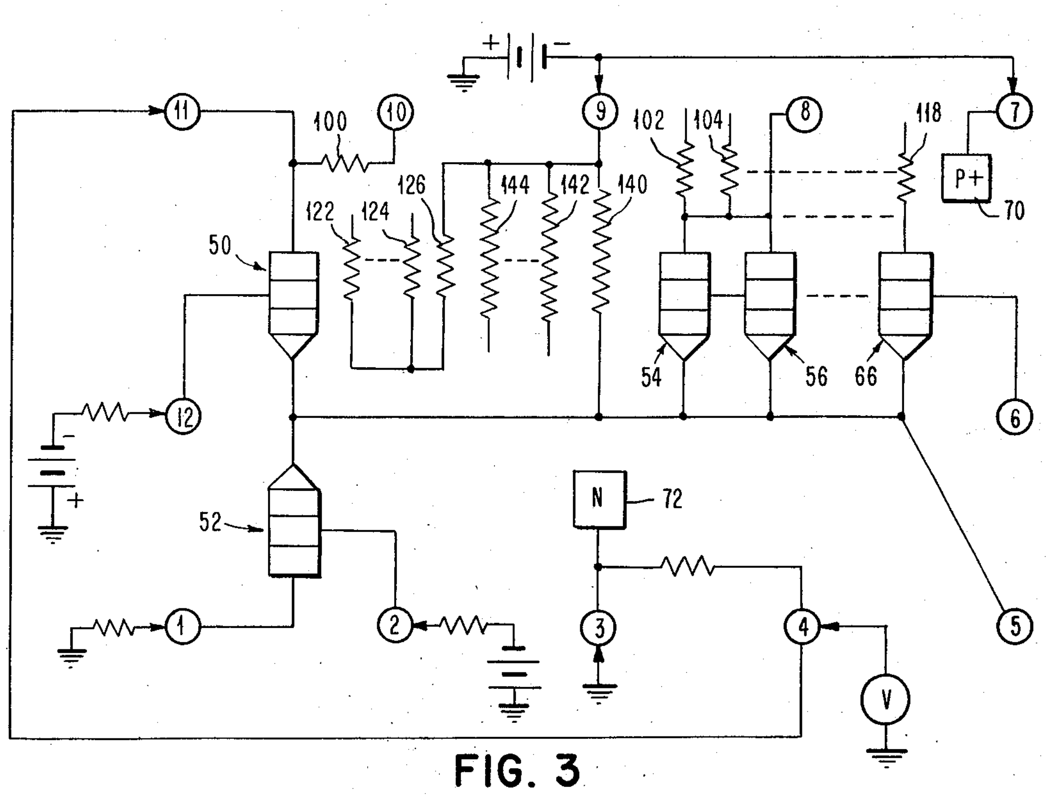
FIG. 3 is a schematic diagram virtually identical to the diagram of FIG. 2, except that different apparatus is shown connected to certain of the test terminals for making other tests on the test pattern.

Referring now to FIG. 3, there will be seen the identical test circuit as was observed in FIG. 2; again, schematically shown. However, there is depicted other testing arrangements, that is, other possible connections of external equipment to the test circuit in order to make measurements. More particularly, with the connection from control terminal 4 to control terminal 11, what is termed "a current switch" circuit is effectively made up and can be effectively tested. The term "current switch" refers to a particular type of switch that has found wide application for obtaining high speed switching operation. In short, it involves the connection of two or more transistors to a common output network at their collectors and correspondingly, at their emitters, a common connection to a source of constant current. Generally, one or the other of the transistors is in the conductive condition and the constant current source transmits current through this one transistor to the output network. However, when conditions change at the input, the constant current is completely switched, in a very short interval, from said one of the transistors to the other.

As has been commented on before, for obtaining the feature of testing so as to avoid parasitics, the underpass ($R_U$) resistor 100 has been connected to the collector of the transistor 50. By virtue of being of the same conductivity type as the collector of the transistor 50, no parasitic transistor or four layer diode action can be encountered. Such parasitic action would normally be encountered with conventionally formed testing circuits. It will, of course, be understood that the underpass resistor 100 is not normally connected in the manner shown in the figures. Rather, in regular integrated circuits, the underpass resistor has the function, as the word implies, of interconnecting elements or components by going underneath a lead or conductor.

The so-called "resistor tracking" furnishes important information on the performing capability of the integrated circuits. This resistor tracking is obtained by straightforward measurements of $R_E$ and $R_C$, that is, the measurements of the resistance of these elements. This is very simply accomplished by way of the terminals 3 and 4 for the $R_C$ resistor 100, and by way of the terminals 9 and 5 for the $R_E$ resistor 140.

Referring now to FIG. 4, there is illustrated a typical FM test site which differs radically from the previously-discussed FE test site. This FM test pattern is on one of the chips 100*a* but at a different location from the chip illustrated in FIG. 1. (See FIG. 6.) The same number of terminals are employed, that is, the twelve terminals so designated. Connected to certain ones of these terminals are pieces of external equipment for testing purposes. The same type of "master slice" is involved here but there is not the circuit interconnection of components such as transistors and resistors. Here the fundamental objective is merely to perform certain measurements, particularly, four terminal measurements of the contact resistance between the interconnection metallurgy. The metalization is shown by means of the heavy lines which extend between terminals. The dashed-stippled pattern indicates the underlying N-type bed, that is to say, the interconnection within the monolith of certain portions of the N-type epitaxial material. It will be noted that the portions of the metalization extending between pairs of terminals vary in thickness. For example, the portion extending between terminals 11 and 12 is fairly thin while the portion between terminals 11 and 9 is much wider. The narrowest portion of the metallurgy may be seen between terminals 8 and 9.

At certain spaced locations, designated A, B, and C, the metallurgy is connected to the silicon substrate. This is done in order to eliminate certain high voltage problems that occur during the sputter etch step, which is a conventionally performed step. Thus, immediately adjacent the terminals 9 it will be seen that a contact is made from the point A on the metallurgical strip down to an underlying resistor. Similarly adjacent the contact terminal 7, another contact, B, is made to the substrate, again for the purpose of eliminating any high voltage problems that may develop.

It will be apparent to those skilled in the art that the sheet resistivity can very easily be measured, with the exact four-terminal method, particularly to derive information on the amount of overetching (see the narrow land between terminals 8 and 9).

The resistance value of predetermined resistors and the contact resistance thereto may be measured by a four-terminal technique using the terminals 1, 2, 3 and 4. This is accomplished by simply feeding a current source between, for example, the terminals 2 and 4 and, then, taking a voltage reading between terminals 1 and 2 in order to derive the value of the lower portion $R_1$ of the resistor underlying the metalization layer. In like manner, the upper portion $R_2$ of the underlying resistor may have its resistance measured.

The large metal area designated 400 which is connected to terminal 5 serves the purpose of measuring pin holes through the conventional silicon oxide layer to the bulk semiconductor. In the event that any pin holes have occurred in the processing, these will be detected by applying a source of current to the terminal 5. It is possible to discriminate between pin holes that extend to P regions and those that extend to N regions. This may be appreciated from the fact that terminal 3 provides a contact to the underlying N-type regions shown by the dashed-stippled pattern, whereas contact to the P-type substrate is provided by virtue of such contact from the terminal 10 down to a P+ isolation diffusion region The interconnection metalization at terminal 8 has been split into two parts. The terminal itself, however, connects both parts through two separate holes in the passivation layer which is applied over the metalization. Thus, this arrangement permits measurement of the contact resistance to the underlying metalization through the normally present "via holes" which extend down from the glass passivation layer to the metalization which extends above the silicon oxide. The particular measurement circuit for this purpose is shown in FIG. 3. The generator 410 is shown connected to the upper pad overlying the split terminal 8 and is also connected to the terminal 6. The voltage reading is taken by connecting the voltmeter 420 to the terminals 9 and 7.

The technique of correlating and assembling the test data so as to obtain a meaningful assessment regarding the predictability of the circuits, i.e. to formulate yield projections and reliability predictions, is indicated in block form in FIG. 5. This correlating technique is normally implemented by the use of a computer program. However, it is not necessary to use such a program. The basic objective is simply to get all the information together that will give a complete picture of what can be expected from the manufacturing process.

A computer program can be adopted and used for processing the test site date and it will have two main functions: data reporting and data analysis. This is indicated by the block diagram in FIG. 5. In the data reporting operation the program gives information about each wafer, such as the raw data for the regular test sites, that is, the electrical test sites (FE), and also for the interconnection or metalization test sites (FM). For example, it gives the average value of each parameter that is tested and then gives the number of units failing each parameter for each wafer and a parameter average for good measurements only. It also finds the median value for each parameter, counts the number of chips with no failing parameters and those with betas less than 25.

The data analysis operation is designed, through a series of logical "if" statements to assign the measurements to different categories such as "open transistor" invalid data, failing parameter, etc.

As has been indicated previously, the number of different test sites, that is, the number of the aforedescribed FE test sites and also of the FM test sites can be varied widely. Typically, the electrical or FE test site is used at ten locations on a wafer and the FM test site at six locations. Since the total number of sites is on the order of 300, it can be appreciated that the loss of regular chips is small when weighed against the advantages that are offered by the test sites.

What has been described herein is a unique testing method for testing the fabrication of integrated circuits so that information can be obtained which will help predict and explain the features of the regular circuits being manufactured. This unique method enables the fulfillment of all of the important functions by giving information which will furnish a complete picture of the success of the manufacturing process. Unlike testing methods known in the prior art the present method enables obtaining information on the critical dynamic electrical characteristics, that is, the switching characteristics of the transistors in integrated circuits. It does this by a unique configuration of transistors at an electrical test site. By this same unique configuration it is possible to get extremely measurements on one of the most critical parameters, namely, $V_{BE}$ of the transistors. Furthermore, switching characteristics can be obtained without introducing parasitic effects, that is, those effects due to transistor or four-layer diode action which is inevitably encountered when the proper resistor is not connected to the collector of the transistor. The present technique also provides minimization of the terminals at a given test site by reason of the unique interconnection scheme adopted.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A process of fabricating monolithic integrated circuits comprising the steps of forming a plurality of regular integrated circuits on a semiconductor wafer and, concomitantly, forming test patterns of different kinds at selected sites on said wafer;

one of the test patterns comprising a test circuit having at least two transistors with their emitters connected to a common point, said common point being connected to a first control terminal, the base and collector of each of said transistors being connected respectively to second and third, fourth and fifth control terminals.

2. A process as defined in claim 1, further including the step of forming an emitter resistor, one end of said resistor being connected to said common point and the other end being connected to a sixth control terminal, whereby the $V_{BE}$ of the two transistors can be measured with a high degree of accuracy.

3. A process as defined in claim 2, further including the step of forming associated emitter resistors and a group of collector resistors, all of which are connected to said sixth control terminal.

4. A process as defined in claim 2, further including the step of forming another group of at least three transistors all of whose emitters are connected to said common point, and all of whose collectors are connected to a seventh control terminal.

5. A process as defined in claim 4, further including another group of resistors having one of their ends connected to said seventh control terminal.

6. A process as defined in claim 5, further including eighth, ninth, tenth, eleventh and twelfth terminals, said eighth terminal being connected to said substrate, said ninth terminal being connected to the epitaxial layer on said substrate and further being connected to a collector resistor whose other end is connected to the tenth control terminal.

7. A process as defined in claim 6, wherein said eleventh terminal is connected to the bases of the transistors in said another group, and said twelfth terminal is connected to an underpass resistor whose other end is connected to the collector of one of said at least two transistors.

8. A process as defined in claim 7, wherein said underpass resistor is of the same conductivity type as the collector of said transistors whereby switching measurements can be made without introducing parasitics into such measurements.

9. A process as defined in claim 1, wherein the other test pattern of different kind comprises a metalization pattern of special configuration.

10. A process as defined in claim 9, where said metalization pattern includes a large area overlying said wafer and connected to a first control terminal.

11. A process as defined in claim 10, further including a plurality of variable width metalization strips connected between pairs of terminals.

12. A process as defined in claim 11, wherein a group of four terminals is connected to an underlying resistor formed in said wafer so as to perform four terminal measurements of the contact resistance between the interconnection metalization and the resistor.

References Cited

UNITED STATES PATENTS

| | | | |
|---|---|---|---|
| 3,134,077 | 5/1964 | Hutchins. | |
| 3,290,179 | 12/1966 | Goulding | 29—574 X |
| 3,333,327 | 8/1967 | Thomas et al. | 29—574 |
| 3,377,513 | 4/1968 | Ashby et al. | |
| 3,423,822 | 1/1969 | Davidson et al. | 29—574 |
| 3,440,715 | 4/1969 | Seng | 29—574 |

PAUL M. COHEN, Primary Examiner

U.S. Cl. X.R.

317—101, 235